(12) United States Patent
Miller

(10) Patent No.: US 11,095,060 B2
(45) Date of Patent: Aug. 17, 2021

(54) BOTTOM LAYER MOUNT FOR USB CONNECTOR

(71) Applicant: ARRIS Enterprises LLC, Suwanee, GA (US)

(72) Inventor: David C. Miller, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/351,017

(22) Filed: Mar. 12, 2019

(65) Prior Publication Data

US 2019/0280412 A1    Sep. 12, 2019

Related U.S. Application Data

(60) Provisional application No. 62/641,641, filed on Mar. 12, 2018.

(51) Int. Cl.
*H01R 13/04*    (2006.01)
*G06F 13/42*    (2006.01)

(52) U.S. Cl.
CPC ......... *H01R 13/04* (2013.01); *G06F 13/4282* (2013.01); *G06F 2213/0042* (2013.01)

(58) Field of Classification Search
CPC .. H01R 12/724; H01R 13/6469; H01R 13/04; G06F 13/4282; G06F 2213/0042
USPC ................. 439/607.35, 607.4, 660
See application file for complete search history.

(56) References Cited

U.S. PATENT DOCUMENTS

| | | | | |
|---|---|---|---|---|
| 6,186,830 B1* | 2/2001 | Lin | ..................... | H01R 13/6594 439/607.4 |
| 6,210,224 B1* | 4/2001 | Wu | ..................... | H01R 13/658 439/607.4 |
| 6,346,009 B1* | 2/2002 | Lin | ..................... | H01R 13/518 439/607.01 |
| 6,398,587 B1* | 6/2002 | Chen | ................... | H01R 12/7023 439/607.35 |
| 6,475,034 B1* | 11/2002 | Zhang | .................... | H01R 13/26 439/607.4 |
| 7,186,149 B2* | 3/2007 | Hashim | ................ | H05K 1/0228 439/344 |
| 8,011,969 B2* | 9/2011 | Wang | ..................... | H01R 24/60 439/660 |
| 8,668,524 B2* | 3/2014 | Lan | ....................... | H01R 12/724 439/607.35 |
| 8,882,542 B2* | 11/2014 | Song | ..................... | H01R 12/707 439/607.4 |
| 2007/0190863 A1* | 8/2007 | Caveney | ............ | H01R 13/7195 439/676 |
| 2010/0240255 A1* | 9/2010 | He | ........................ | H01R 12/707 439/607.35 |

(Continued)

FOREIGN PATENT DOCUMENTS

WO    WO-2014120635 A1 *    8/2014    ............. H05K 1/141

*Primary Examiner* — Abdullah A Riyami
*Assistant Examiner* — Marcus E Harcum
(74) *Attorney, Agent, or Firm* — Wenderoth, Lind & Ponack, L.L.P.

(57) ABSTRACT

In embodiments, a USB connector may include a plurality of pins on a front surface and a plurality of pins on a top surface. The pins may be oriented and positioned on the USB connector such that the USB connector may be mounted to the bottom layer of a PCB. Corresponding pins of the USB connector may be conductively connected and may be mated with corresponding pins of the PCB.

3 Claims, 12 Drawing Sheets

(56) References Cited

U.S. PATENT DOCUMENTS

| | | | | |
|---|---|---|---|---|
| 2011/0159746 A1* | 6/2011 | He | H01R 13/6473 | 439/660 |
| 2012/0252279 A1* | 10/2012 | Lee | G06F 1/3206 | 439/660 |
| 2013/0323978 A1* | 12/2013 | Ho | H01R 13/04 | 439/626 |
| 2014/0273624 A1* | 9/2014 | Hashim | H01R 13/6466 | 439/607.01 |
| 2014/0349496 A1* | 11/2014 | Zhu | H05K 1/0219 | 439/108 |
| 2014/0370751 A1* | 12/2014 | Zheng | H01R 13/6581 | 439/607.35 |
| 2014/0370752 A1* | 12/2014 | Ho | H01R 13/6594 | 439/607.35 |
| 2015/0214666 A1* | 7/2015 | Schumacher | H01R 13/6477 | 439/676 |
| 2015/0357760 A1* | 12/2015 | Aihara | H05K 1/0228 | 439/55 |
| 2016/0036166 A1* | 2/2016 | Hashim | H01R 13/6658 | 439/676 |
| 2016/0365655 A1* | 12/2016 | Tsai | H01R 12/724 | |
| 2016/0372850 A1* | 12/2016 | Tsai | H01R 12/724 | |
| 2017/0025772 A1* | 1/2017 | Yu | H01R 12/724 | |
| 2018/0098415 A1* | 4/2018 | Lin | H05K 3/10 | |

* cited by examiner

BOTTOM LAYER MOUNT FOR USB CONNECTOR

CROSS REFERENCE TO RELATED APPLICATION

This application is a non-provisional application claiming the benefit of U.S. Provisional Application Ser. No. 62/641,641, entitled "Bottom Layer Mount for USB Connector," which was filed on Mar. 12, 2018, and is incorporated herein by reference in its entirety.

TECHNICAL FIELD

This disclosure relates to a bottom layer mount for a USB connector.

BACKGROUND

With current USB (universal serial bus) connector designs, a 5 Gbps differential pair (8&9) has to transition from a top layer of a PCB (printed circuit board) to a bottom layer of the PCB and back to the top layer of the PCB. The transitions are potential sources of radiated emission.

Currently, a 480 Mbps 100 ohm differential signal pair is split into two single-ended 50 ohm traces in order to route around pin 7. Each of the single-ended 50 ohm traces are potential sources of emissions.

It is desirable to provide an improved USB connector mount.

BRIEF DESCRIPTION OF THE DRAWINGS

Like reference numbers and designations in the various drawings indicate like elements.

DETAILED DESCRIPTION

It is desirable to provide an improved USB connector mount. In embodiments, a USB connector may include a plurality of pins on a front surface and a plurality of pins on a top surface. The pins may be oriented and positioned on the USB connector such that the USB connector may be mounted to the bottom layer of a PCB. Corresponding pins of the USB connector may be conductively connected and may be mated with corresponding pins of the PCB.

Figure 1:
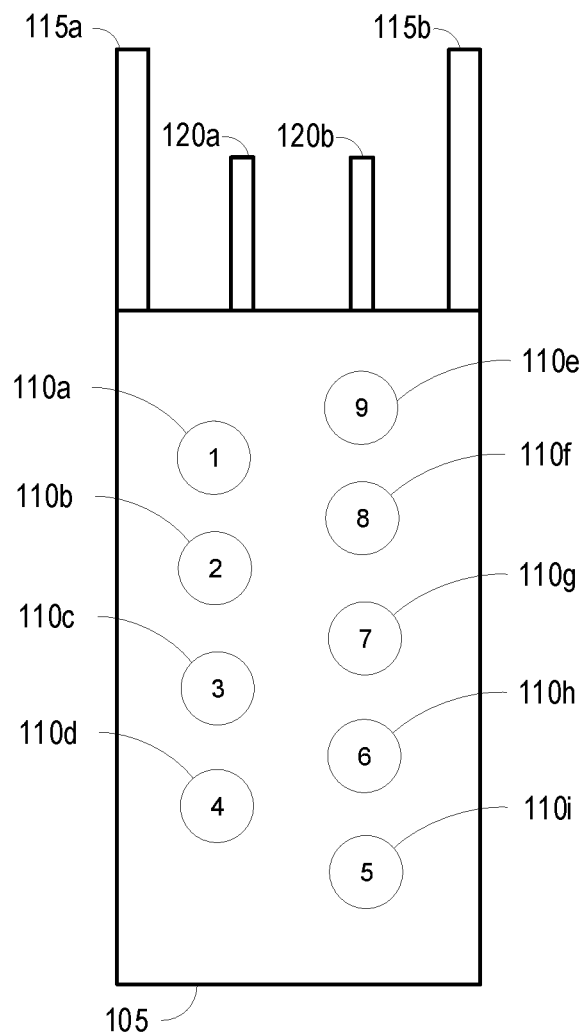
FIG. 1 shows an example illustration of a front view of a USB connector.

FIG. 1 shows an example illustration of a front view of a USB connector 105. The front surface of the USB connector 105 may include a plurality of pins 110a-i. The plurality of pins 110a-i may be positioned and oriented on the front surface of the USB connector 105 so as to be mated with one or more pins of a USB plug.

In embodiments, the USB connector 105 may include a plurality of mounting arms 115a-b. The mounting arms 115a-b may extend upward and away from the top surface of the USB connector 105 and the mounting arms 115a-b may be used to mount the USB connector 105 to a PCB (printed circuit board).

In embodiments, the top surface of the USB connector 105 may include a plurality of pins 120a-b. The plurality of pins 120a-b may be positioned and oriented on the top surface of the USB connector 105 so as to mate with a plurality of pins of a PCB.

In embodiments, the USB connector 105 may be mounted to a bottom-side (i.e., a bottom layer) of a PCB. The USB connector 105 may be a USB 3.0 connector.

Pins 110a-i may be positioned on the front surface of the USB connector 105 in two columns. From the perspective shown in FIG. 1, a first column of pins may be to the left of a second column of pins. The first column of pins may include four pins positioned in the following order (from top of the USB connector 105 to the bottom of the USB connector 105): pin 1 (e.g., pin 110a); pin 2 (e.g., pin 110b); pin 3 (e.g., pin 110c); and pin 4 (e.g., pin 110d). The second column of pins may include five pins positioned in the following order (from top of the USB connector 105 to the bottom of the USB connector 105): pin 9 (e.g., pin 110e); pin 8 (e.g., pin 110f); pin 7 (e.g., 110g); pin 6 (e.g., pin 110h); and pin 5 (e.g., pin 110i).

It should be understood that the pins 110a-i and the corresponding pins 120 may be conductively connected to each other. For example, pin 1 on the front surface of the USB connector 105 may be conductively connected to pin 1 on the top surface of the USB connector 105, pin 2 on the front surface of the USB connector 105 may be conductively connected to pin 2 on the top surface of the USB connector 105, and so on.

Figure 2:
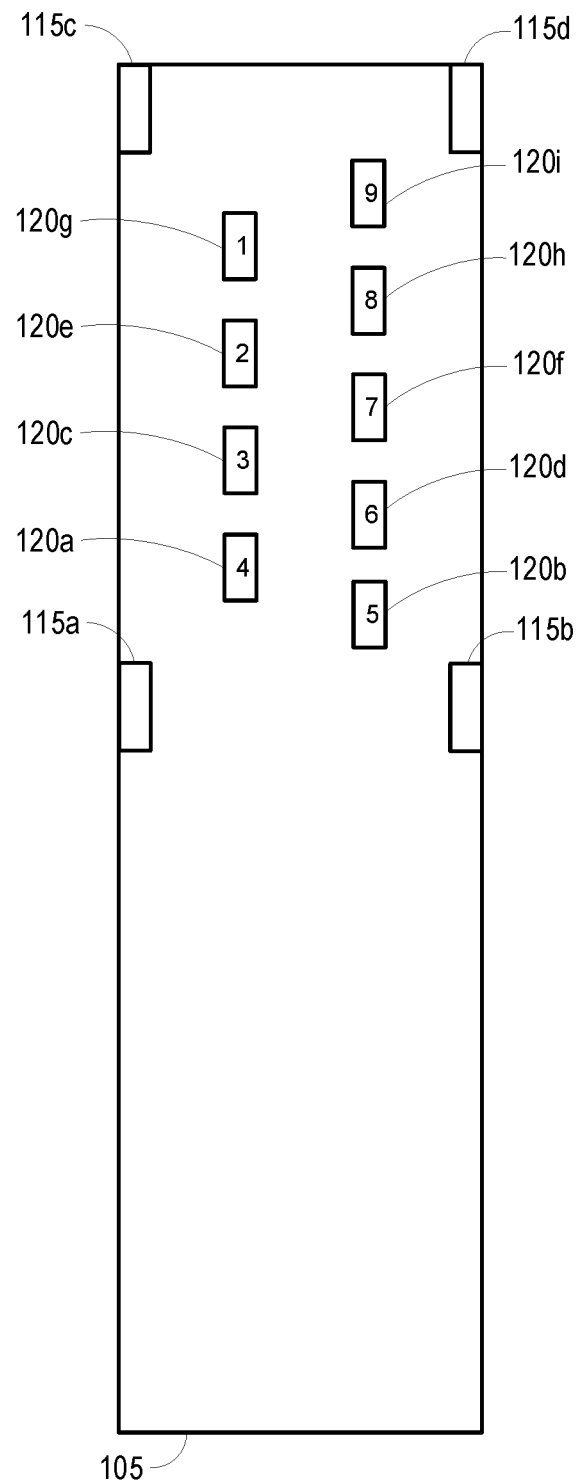
FIG. 2 shows an example illustration of a top view of a USB connector.

FIG. 2 shows an example illustration of a top view of a USB connector 105.

In embodiments, the top surface of the USB connector 105 may include a plurality of mounting arms 115a-d. For example four mounting arms 115a-d may extend upward and away from the top surface of the USB connector 105 and the mounting arms 115a-b may be used to mount the USB connector 105 to a PCB (printed circuit board).

In embodiments, the top surface of the USB connector 105 may include a plurality of pins 120a-i. The plurality of pins 120a-i may be positioned and oriented on the top surface of the USB connector 105 so as to mate with a plurality of pins of a PCB.

Pins 120a-i may be positioned on the top surface of the USB connector 105 in two columns. From the perspective shown in FIG. 2, a first column of pins may be to the left of a second column of pins. The first column of pins may include four pins positioned in the following order (from the rear of the USB connector 105 to the front of the USB connector 105): pin 1 (e.g., pin 120g); pin 2 (e.g., pin 120e); pin 3 (e.g., pin 120c); and pin 4 (e.g., pin 120a). The second column of pins may include five pins positioned in the following order (from rear of the USB connector 105 to the front of the USB connector 105): pin 9 (e.g., pin 120*i*); pin 8 (e.g., pin 120*h*); pin 7 (e.g., 120*f*); pin 6 (e.g., pin 120*d*); and pin 5 (e.g., pin 120*b*).

It should be understood that the pins 120*a-i* and the corresponding pins 110*a-i* of FIG. 1 may be conductively connected to each other. For example, pin 1 on the front surface of the USB connector 105 may be conductively connected to pin 1 on the top surface of the USB connector 105, pin 2 on the front surface of the USB connector 105 may be conductively connected to pin 2 on the top surface of the USB connector 105, and so on.

Figure 3:
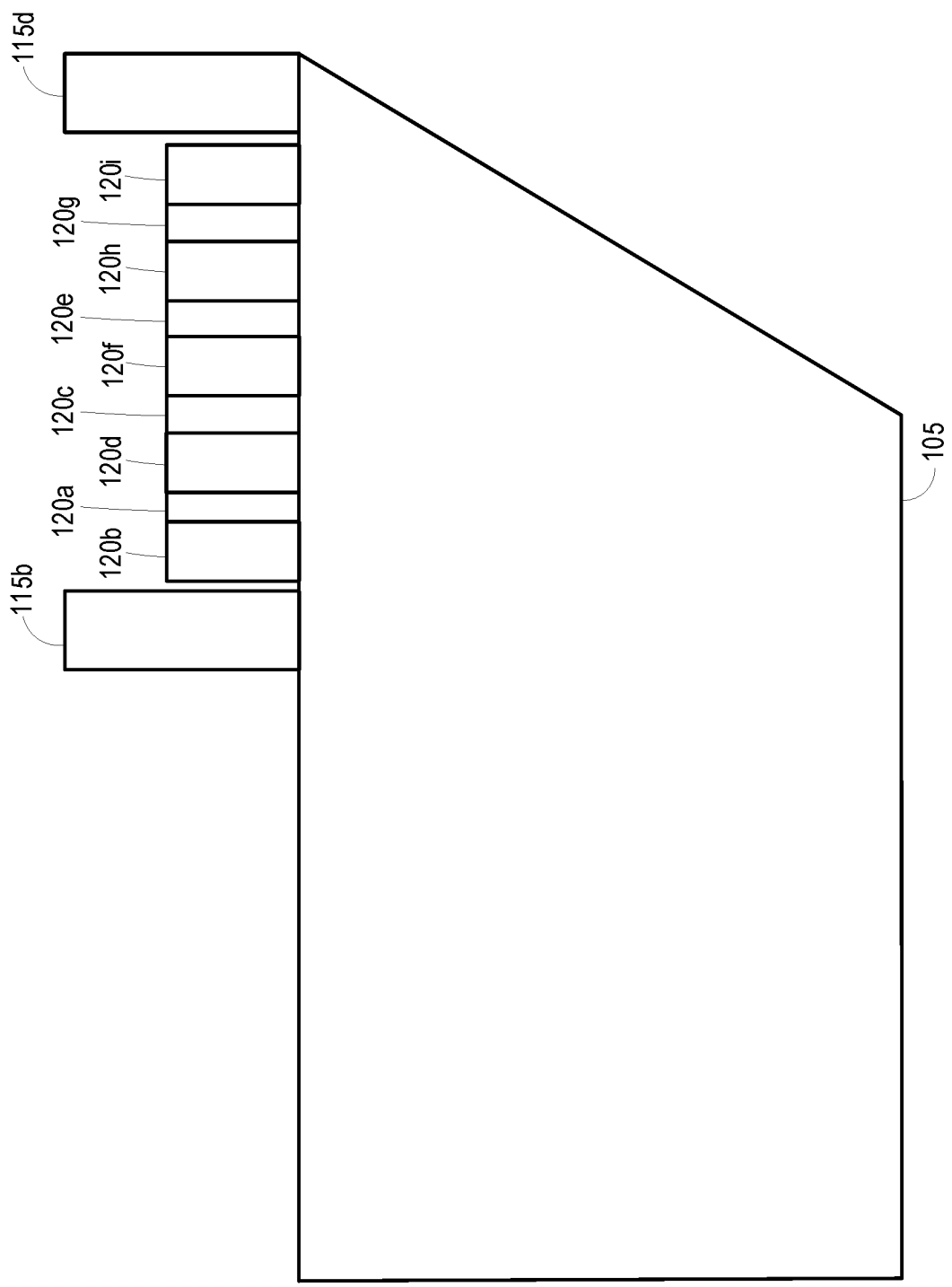
FIG. 3 shows an example illustration of a side view of a USB connector.

FIG. 3 shows an example illustration of a side view of a USB connector 105.

In embodiments, the top surface of the USB connector 105 may include a plurality of mounting arms 115*b-d*.

In embodiments, the top surface of the USB connector 105 may include a plurality of pins 120*a-i*.

Figure 4:
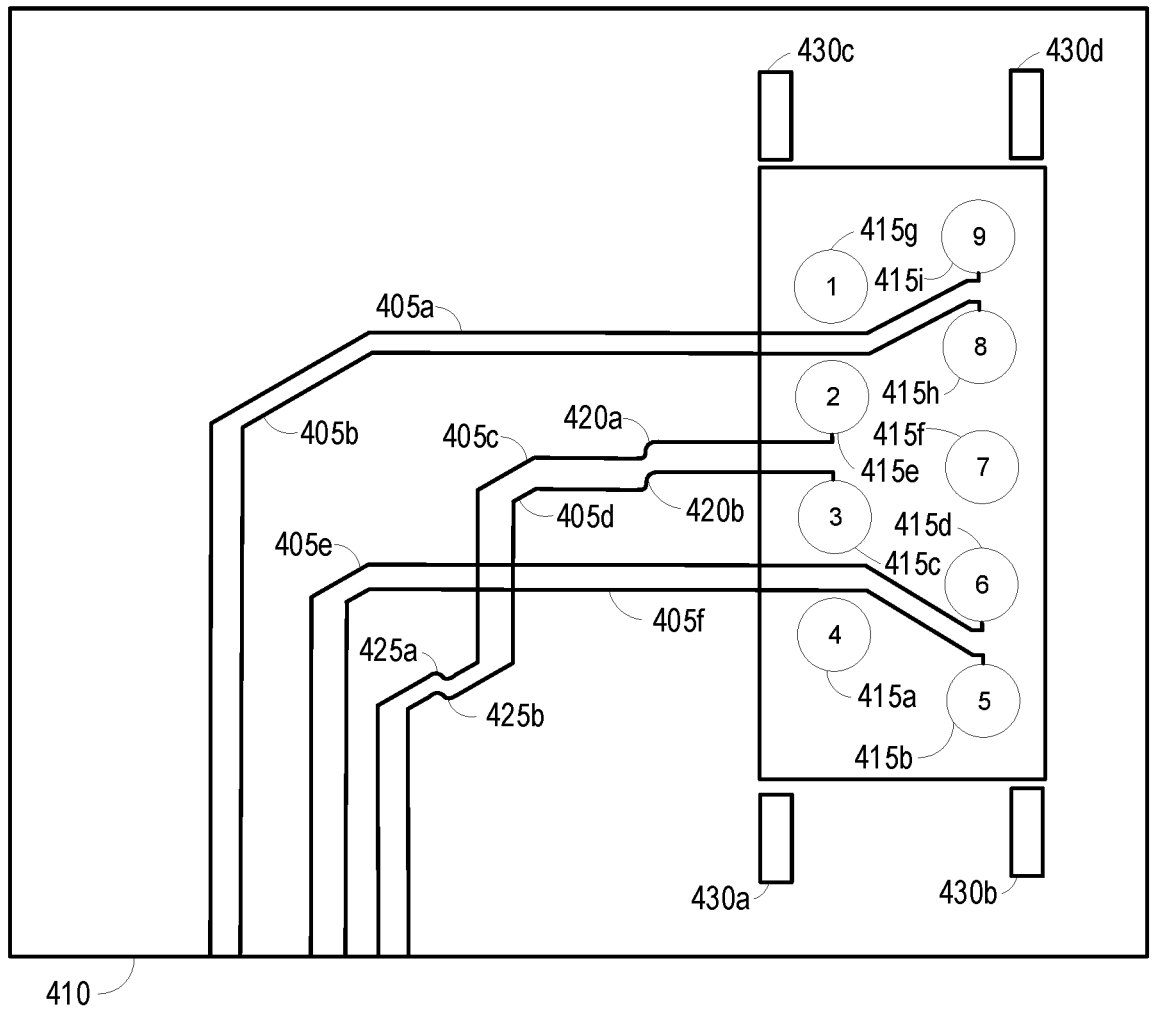
FIG. 4 shows an example block diagram of a plurality of signal paths of a PCB.

FIG. 4 shows an example block diagram of a plurality of signal paths 405*a-f* of a PCB 410. The view shown in FIG. 4 is a view of the bottom side (e.g., bottom layer) of the PCB 410.

In embodiments, the PCB 410 may include a plurality of pins 415*a-i*.

In embodiments, each respective one signal path of the plurality of signal paths 405*a-f* may be designated for carrying communications or signals to and/or from a specific pin of the plurality of pins 415*a-i*. For example, signal path 405*a* may be designated to carry communications or signals to and/or from pin 9 (e.g., pin 415*i*), signal path 405*b* may be designated to carry communications or signals to and/or from pin 8 (e.g., pin 415*h*), signal path 405*c* may be designated to carry communications or signals to and/or from pin 2 (e.g., pin 415*e*), signal path 405*d* may be designated to carry communications or signals to and/or from pin 3 (e.g., pin 415*c*), signal path 405*e* may be designated to carry communications or signals to and/or from pin 6 (e.g., pin 415*d*), and signal path 405*f* may be designated to carry communications or signals to and/or from pin 5 (e.g., pin 415*b*).

In embodiments, the plurality of pins 415*a-i* may be positioned and oriented on the PCB 410 such that each respective pin of the plurality of pins 415*a-i* may be aligned and mated (e.g., positioned to make contact) with a corresponding pin of a USB connector (e.g., pins 120*a-i* of the USB connector 105 of FIG. 1). For example, the USB connector 105 may be mounted to the bottom side of the PCB 410 such that pin 1 on the top side of the USB connector (e.g., pin 120*g*) mates with pin 1 of the PCB (e.g., pin 415*g*), pin 2 on the top side of the USB connector (e.g., pin 120*e*) mates with pin 2 of the PCB (e.g., pin 415*e*), and so on.

In embodiments, from the bottom perspective, the pins 415*a-i* may be positioned and oriented on the PCB in two columns. From the perspective shown in FIG. 4, a first column of pins may be to the left of a second column of pins. The first column of pins may include four pins positioned in the following order (from the top to the bottom): pin 1 (e.g., pin 415*g*); pin 2 (e.g., pin 415*e*); pin 3 (e.g., pin 415*c*); and pin 4 (e.g., pin 415*a*). The second column of pins may include five pins positioned in the following order (from the top to the bottom): pin 9 (e.g., pin 415*i*); pin 8 (e.g., pin 415*h*); pin 7 (e.g., 415*f*); pin 6 (e.g., pin 415*d*); and pin 5 (e.g., pin 415*b*). The pins 415*a-i* may be aligned such that signal paths carrying signals associated with pins 9 and 8 pass in between pins 1 and 2, signal paths carrying signals associated with pins 5 and 6 pass in between pins 3 and 4, and signal paths carrying signals associated with pins 2 and 3 are directed away from pin 7 and are not split to travel around pin 7.

In embodiments, the signal paths designated for carrying communications associated with pins 2 and 3 may include a step-up 420*a-b* and a step-down 425*a-b*. For example, signal path 405*c* may transition to a top layer of the PCB 410 via the step-up 420*a*, cross over the top of signal paths 405*e* and 405*f*, and transition back to the bottom layer of the PCB 410 via the step-down 425*a*. Signal path 405*d* may transition to a top layer of the PCB 410 via the step-up 420*b*, cross over the top of signal paths 405*e* and 405*f*, and transition back to the bottom layer of the PCB 410 via the step-down 425*b*.

In embodiments, the bottom surface of the PCB 410 may include a plurality of openings 430*a-d*. Each respective one opening of the plurality of openings 430*a-d* may be positioned, sized, and oriented so as to accept a corresponding mounting arm of a USB connector (e.g., a mounting arms 115*a-d* of the USB connector 105 of FIG. 1).

In embodiments, 5 Gbps differential signal pairs may be routed straight along the back side of the tongue. For example, the 5 Gbps differential signal pairs may be routed in the same manner as the PCB Top-Side Mounted USB 3.0 Connector (pins 8 & 9 and pins 5 & 6).

In embodiments, 480 Mbps differential signal pairs may be routed along the tongue. For example, the 480 Mbps differential signal pairs may be routed in the same manner as the PCB Top-Side Mounted USB 3.0 Connector (pins 8 & 9 and pins 5 & 6). The 480 Mbps differential signal pair may be routed straight into pins 2 & 3.

In embodiments, the 480 Mbps 100 ohm differential signal pair (e.g., signal paths carrying communications associated with pins 2 and 3) does not require re-routing around pin 7, thus, the 480 Mbps 100 ohm differential signal pair is not split into two single-ended 50 ohm traces, and the potential emissions caused by the two single-ended 50 ohm traces is avoided.

In embodiments, the USB connector described herein eliminates the potential signal interference and cross-coupling of the 5 Gbps signaling onto the 480 Mbps signaling as well as signal interference and cross coupling of the 480 Mbps signaling onto the 5 Gbps signaling.

In embodiments, pin signal routes on each side of the tongue for the USB connector described herein (e.g., the bottom-side PCB Mounted USB 3.0 Connector) may be a mirror image of the signal routes over the tongue for the Top-Side PCB Mounted USB 3.0 Connector.

In embodiments, the USB connector 105 of FIG. 1 eliminates the need for the 5 Gbps differential pair (8&9) to transition from top to bottom layer and back to top layer of the PCB 410. The signal paths 405*a-b* (e.g., the signal paths carrying signals associated with pins 8 and 9) do not transition from the top layer to the bottom layer of the PCB 410, and the signal paths 405*a-b* do not cross any of the other signal paths carrying signals to and/or from a USB connector 105 (e.g., signal paths 405*c-f*).

Figure 5:
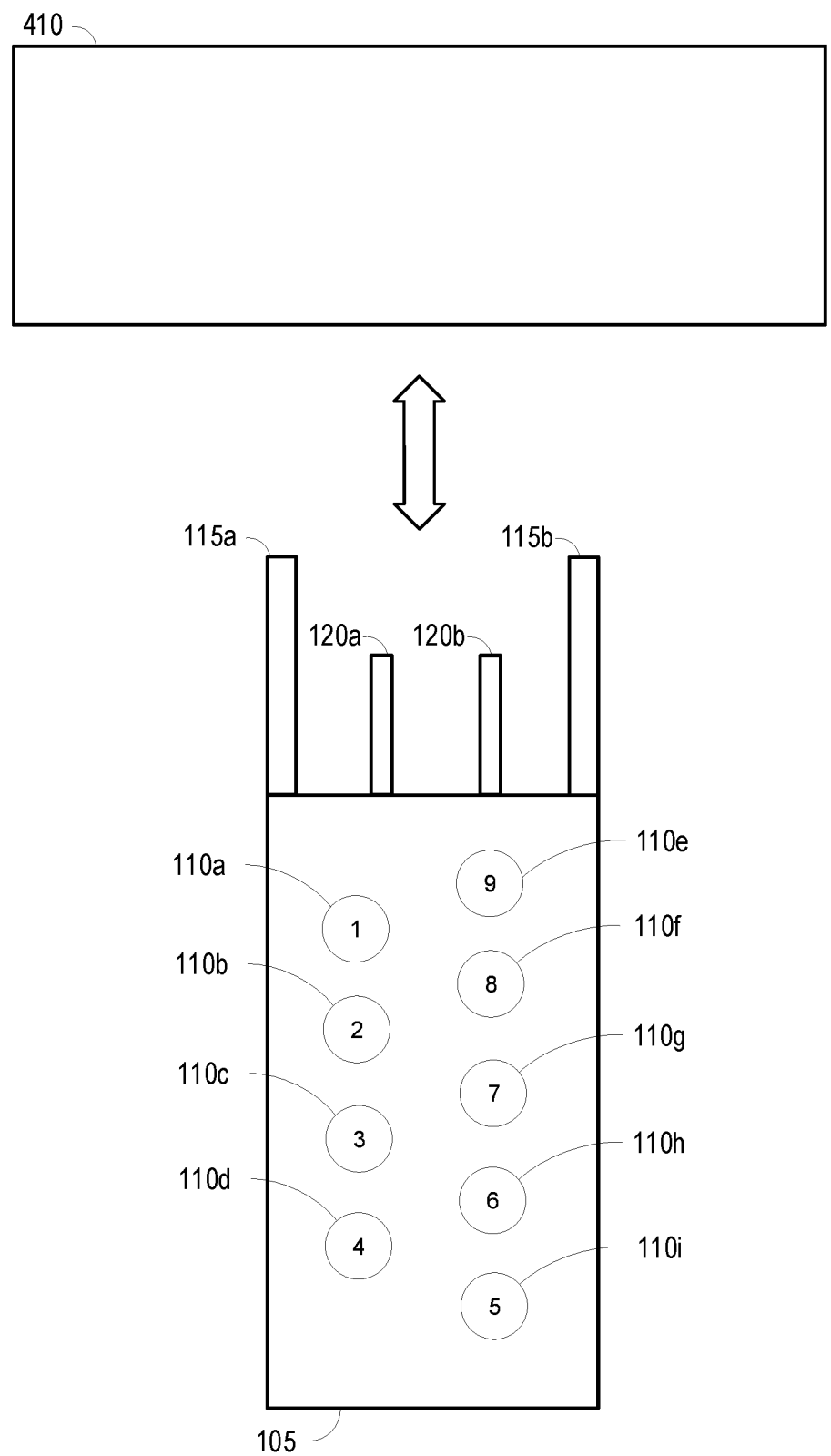
FIG. 5 shows an example exploded view of a USB connector that may be connected to a PCB.

FIG. 5 shows an example exploded view of a USB connector 105 that may be connected to a PCB 410. In embodiments, each respective one of the plurality of mounting arms 115*a-d* may be inserted into a corresponding opening (e.g., opening 430*a-d* of FIG. 4) on the bottom surface of the PCB 410. Each respective pin of the plurality of pins 120*a-i* may be inserted into a corresponding pin (e.g., pins 415*a-i*) located on the bottom surface of the PCB 410.

In embodiments, a plurality of pins 110*a-i* may be positioned and oriented on the front surface of the USB connector 105 so as to be mated with one or more pins of a USB plug (e.g., a USB male connector).

Figure 6:
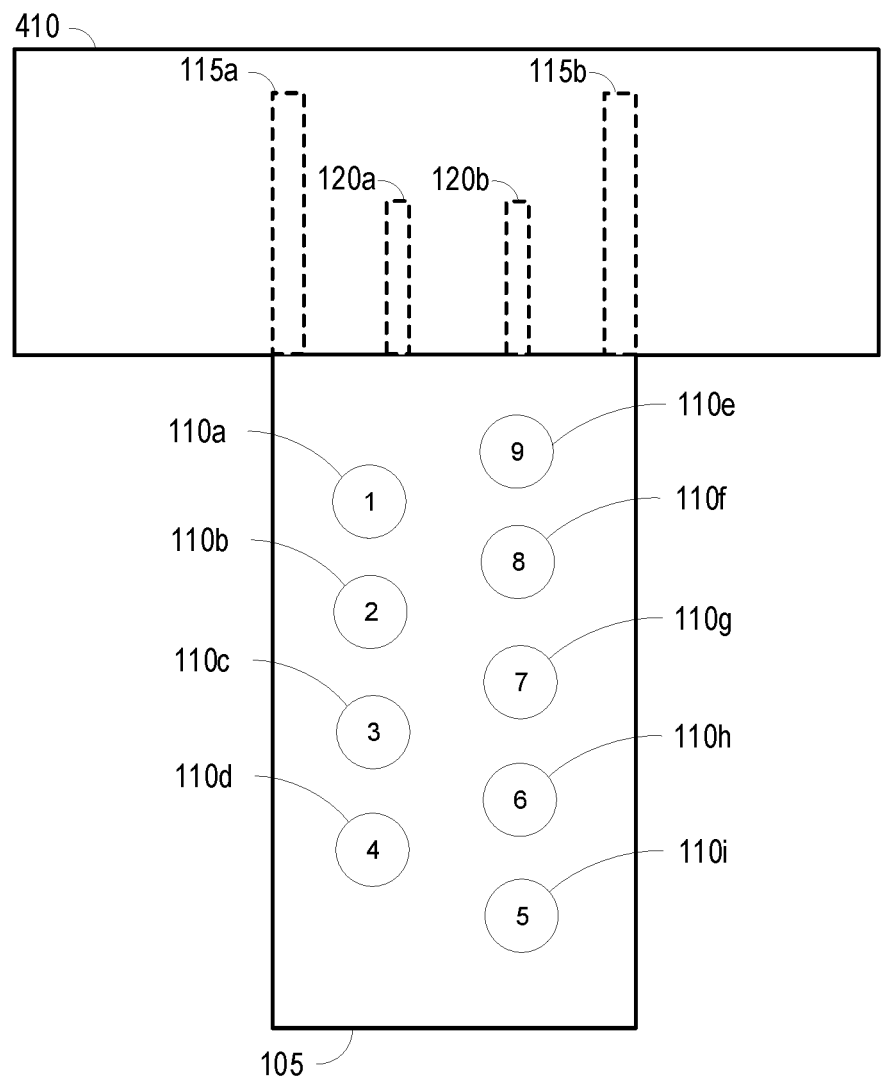
FIG. 6 shows an example view of a USB connector mounted to a PCB.

FIG. 6 shows an example view of a USB connector 105 mounted to a PCB 410. In embodiments, the top surface of the USB connector 105 may be mounted to the bottom surface of the PCB 410. Each respective one of a plurality of mounting arms 115a-d may be inserted into a corresponding opening (e.g., opening 430a-d of FIG. 4) on the bottom surface of the PCB 410. Each respective one pin of a plurality of pins 120a-i may be inserted into a corresponding pin (e.g., pins 415a-i) located on the bottom of the PCB 410.

In embodiments, a plurality of pins 110a-i may be positioned and oriented on the front surface of the USB connector 105 so as to be mated with one or more pins of a USB plug (e.g., a USB male connector).

Figure 7:
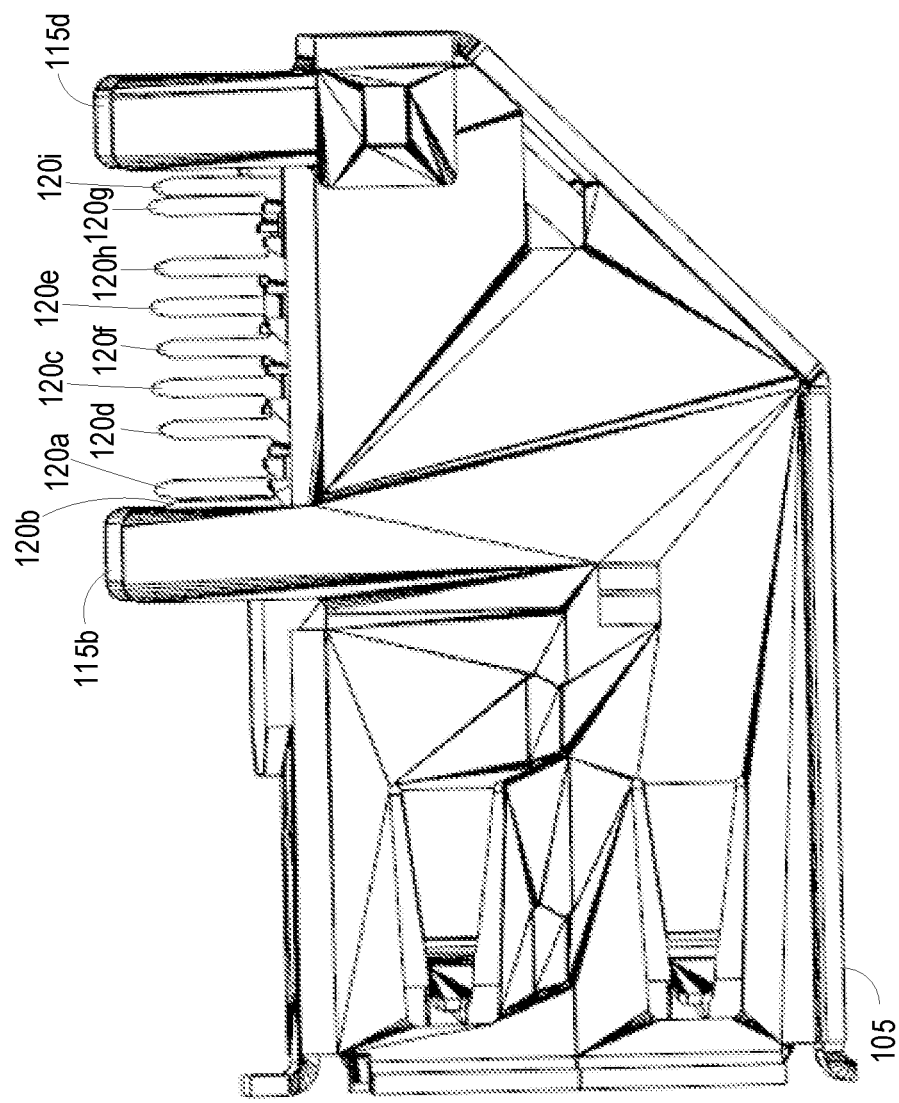
FIG. 7 shows an example illustration of a side view of an enclosure of a USB connector.

FIG. 7 shows an example illustration of a side view of an enclosure of a USB connector 105.

In embodiments, the top surface of the USB connector 105 may include a plurality of mounting arms 115b-d.

In embodiments, the top surface of the USB connector 105 may include a plurality of pins 120a-i.

Figure 8:
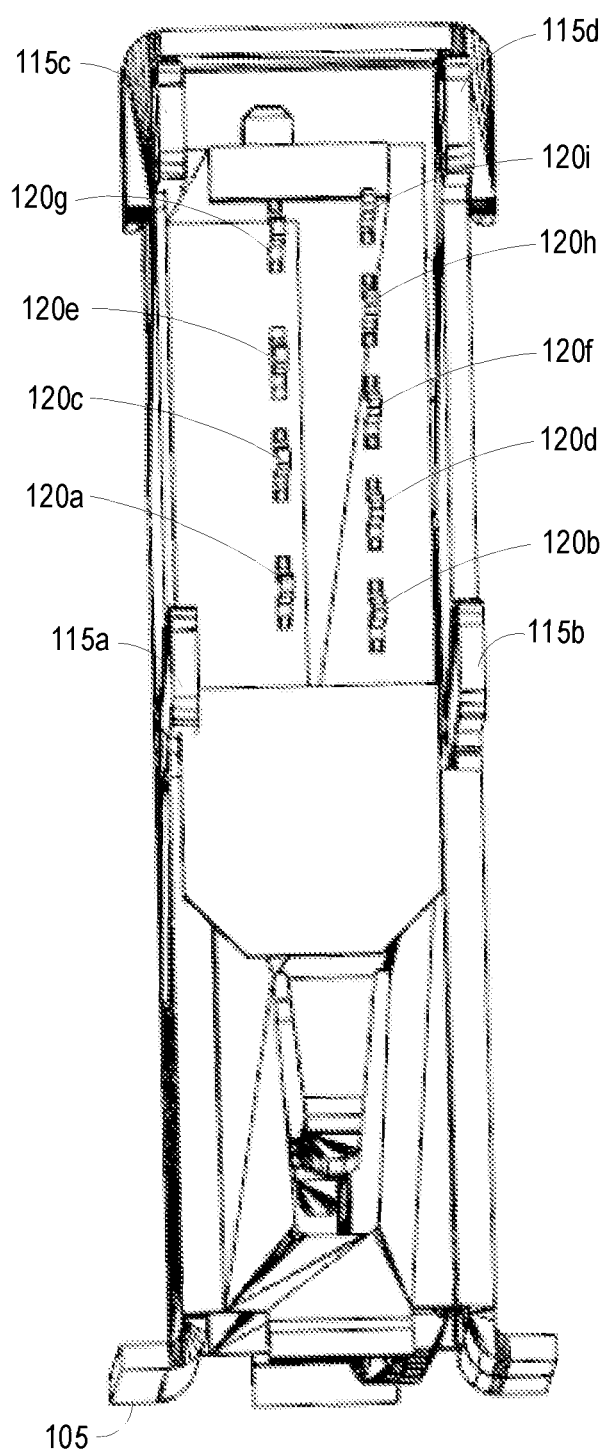
FIG. 8 shows an example illustration of a top view of an enclosure of a USB connector.

FIG. 8 shows an example illustration of a top view of an enclosure of a USB connector 105.

In embodiments, the top surface of the USB connector 105 may include a plurality of mounting arms 115a-d.

In embodiments, the top surface of the USB connector 105 may include a plurality of pins 120a-i. The plurality of pins 120a-i may be positioned and oriented on the top surface of the USB connector 105 so as to mate with a plurality of pins of a PCB.

Figure 9:
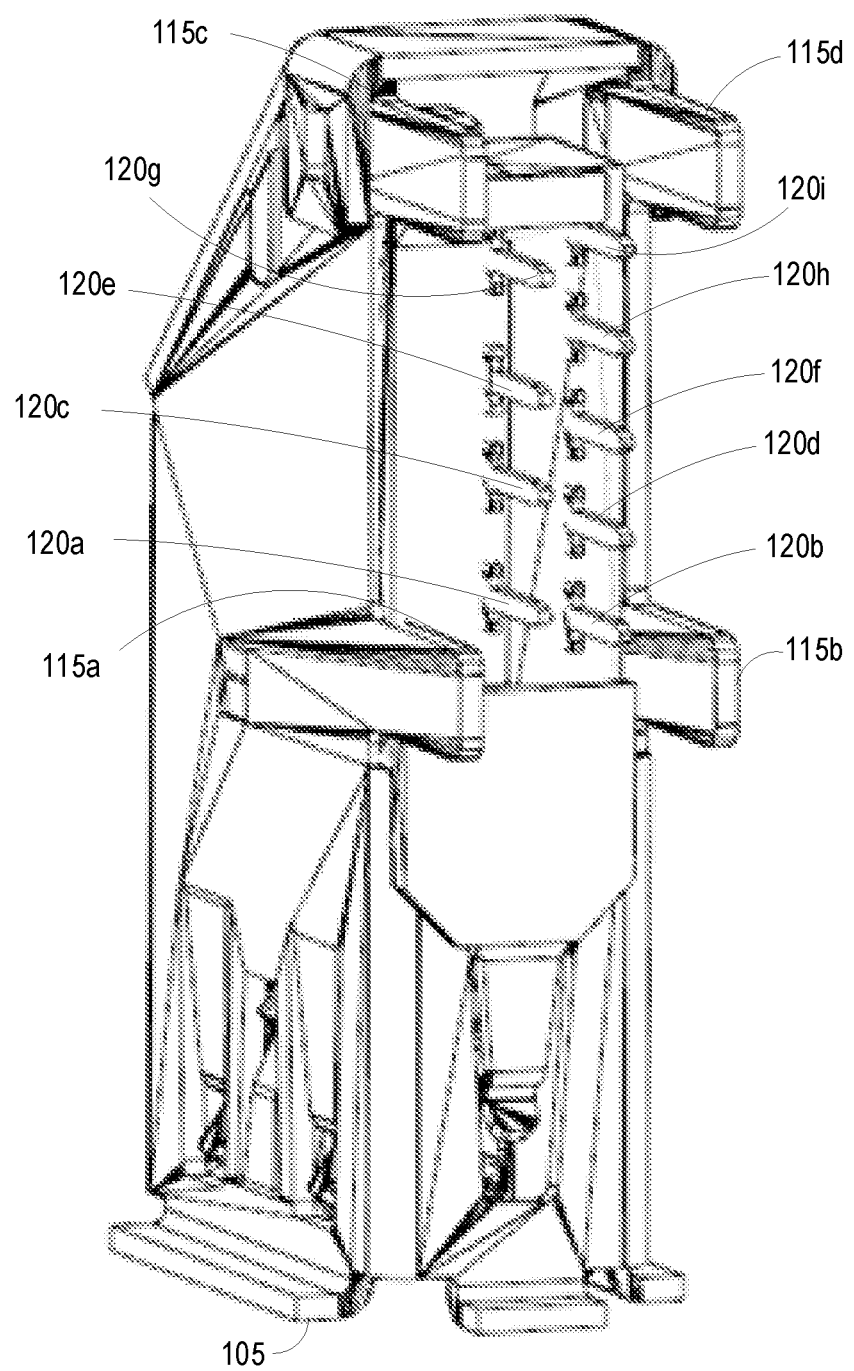
FIG. 9 shows an example illustration of a top perspective view of an enclosure of a USB connector.

FIG. 9 shows an example illustration of a top perspective view of an enclosure of a USB connector 105.

In embodiments, the top surface of the USB connector 105 may include a plurality of mounting arms 115a-d.

In embodiments, the top surface of the USB connector 105 may include a plurality of pins 120a-i. Each respective one pin of the plurality of pins 120a-i may extend upwards and away from the top surface of the USB connector 105.

Figure 10:
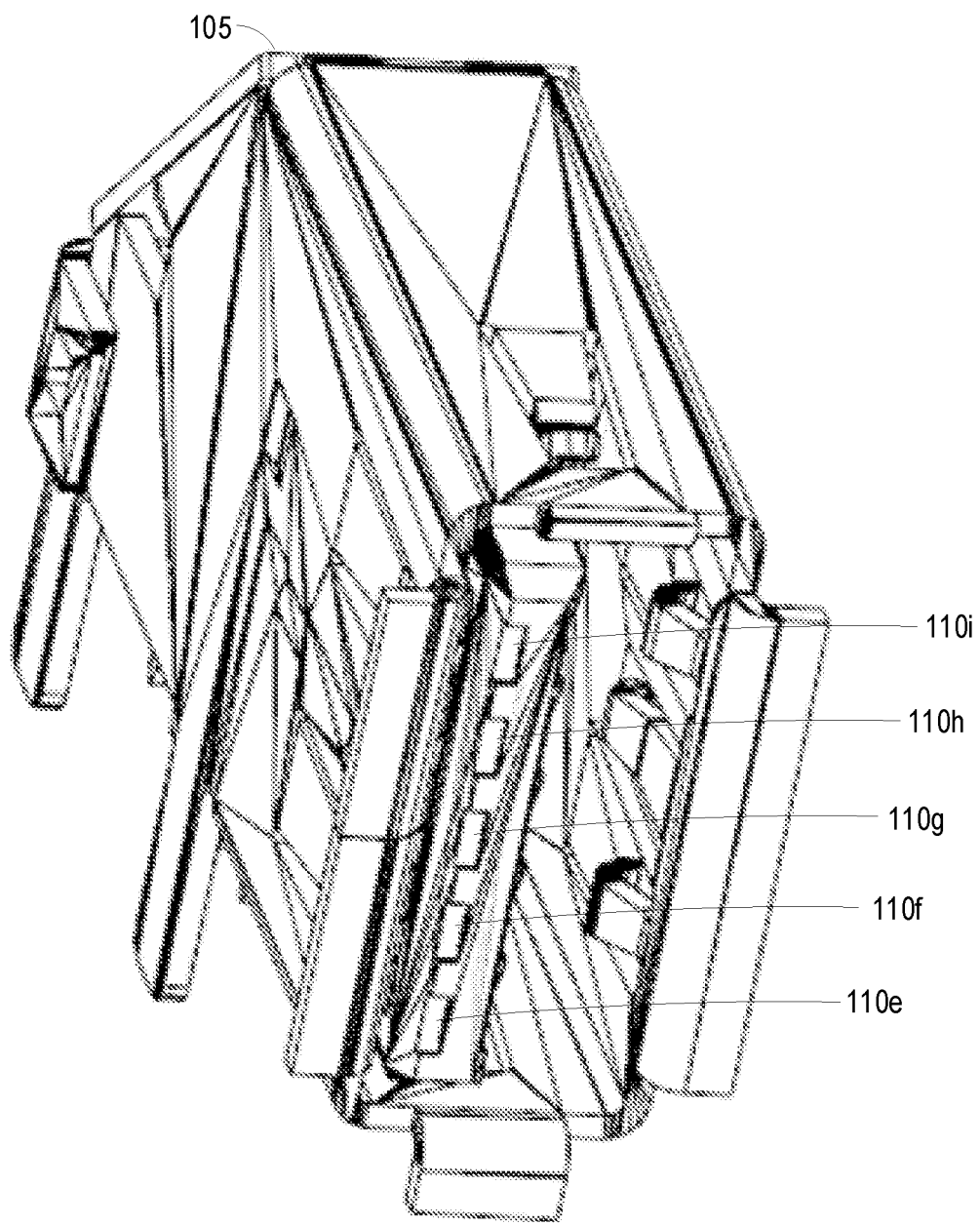
FIG. 10 shows an example illustration of a front perspective view of an enclosure of a USB connector.

FIG. 10 shows an example illustration of a front perspective view of an enclosure of a USB connector 105. Pins 105e-i may be contacts within the front surface of the USB connector 105.

Figure 11:
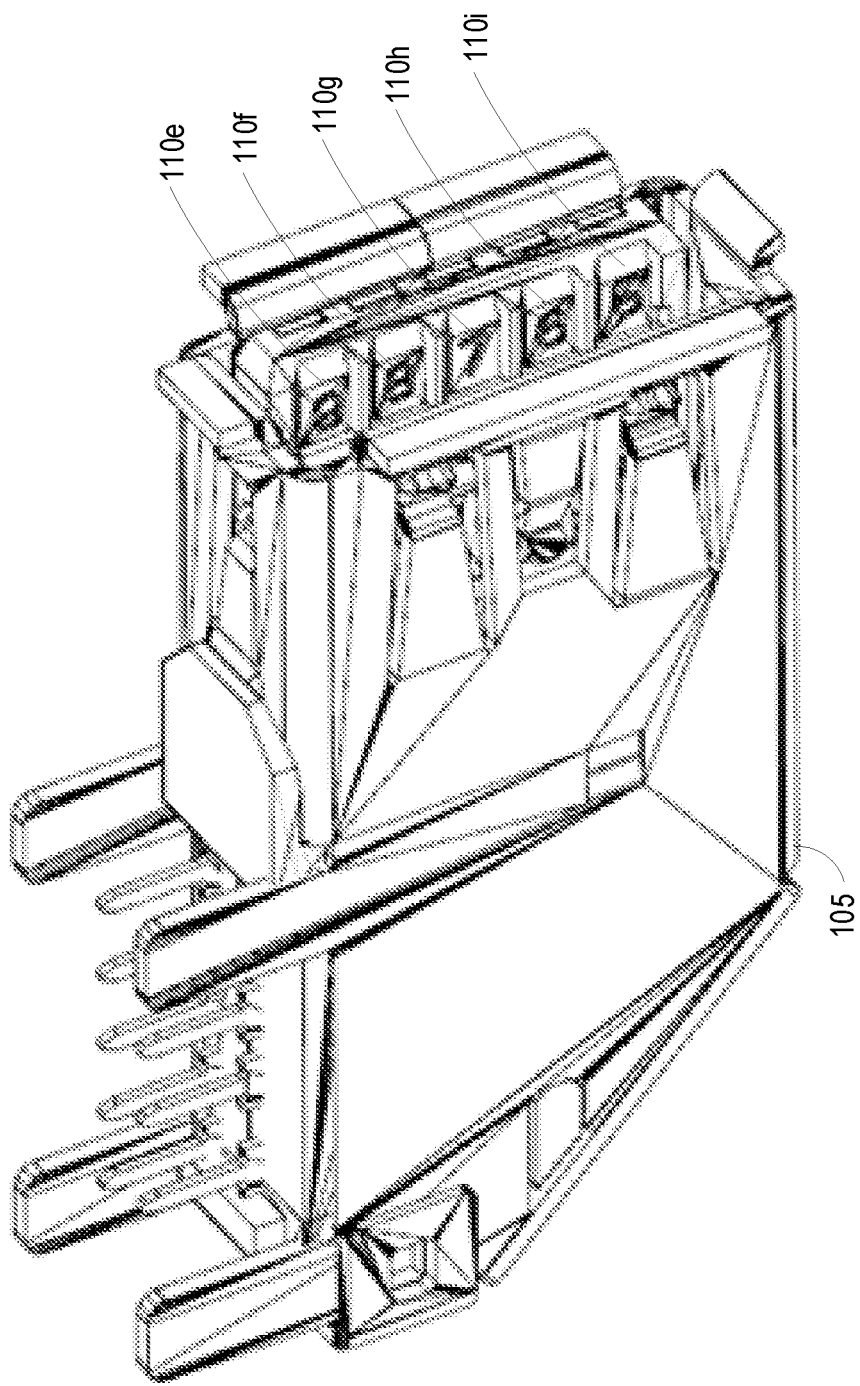
FIG. 11 shows an example illustration of a side perspective view of an enclosure of a USB connector.

FIG. 11 shows an example illustration of a side perspective view of an enclosure of a USB connector 105. Pins 105e-i may be contacts within the front surface of the USB connector 105.

Figure 12:
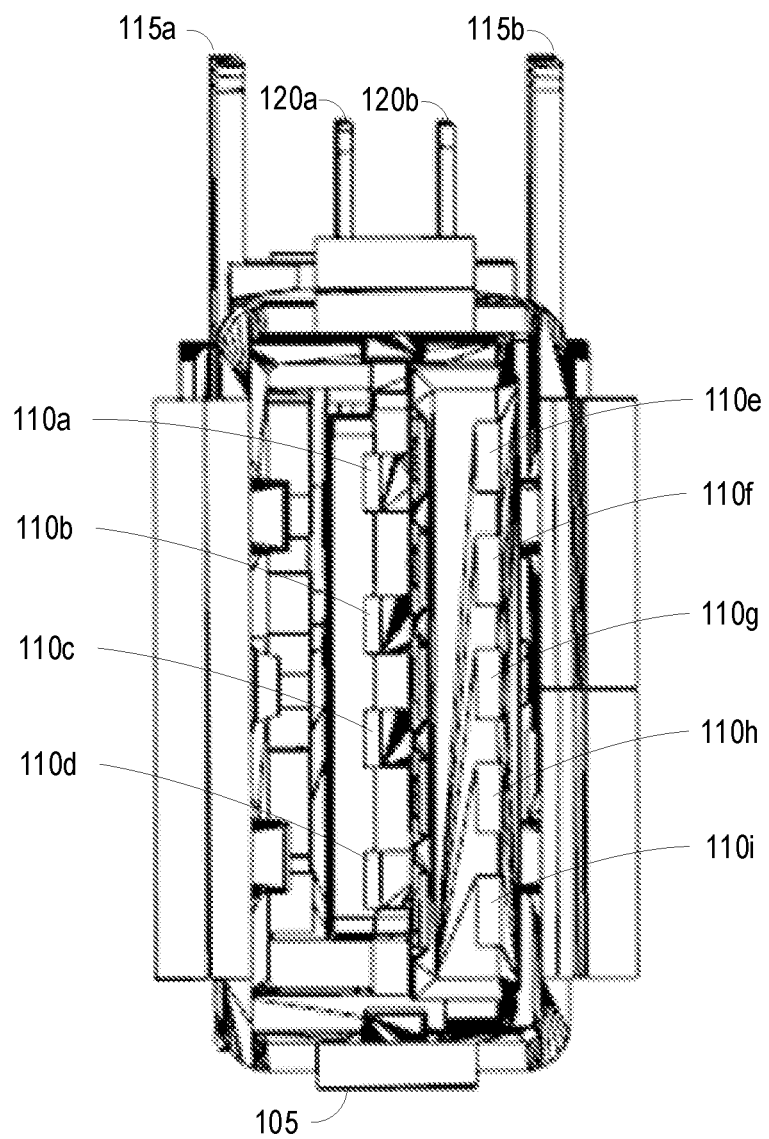
FIG. 12 shows an example illustration of a front view of an enclosure of a USB connector.

FIG. 12 shows an example illustration of a front view of an enclosure of a USB connector 105. The front surface of the USB connector 105 may include a plurality of pins 110a-i. The plurality of pins 110a-i may be positioned and oriented on the front surface of the USB connector 105 so as to be mated with one or more pins of a USB plug. The plurality of pins 110a-i may be electrical contacts that are positioned within the front surface of the USB connector 105.

In embodiments, the USB connector 105 may include a plurality of mounting arms 115a-b. The mounting arms 115a-b may extend upward and away from the top surface of the USB connector 105 and the mounting arms 115a-b may be used to mount the USB connector 105 to a PCB (printed circuit board).

In embodiments, the top surface of the USB connector 105 may include a plurality of pins 120a-b. The plurality of pins 120a-b may be positioned and oriented on the top surface of the USB connector 105 so as to mate with a plurality of pins of a PCB.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

I claim:

1. An USB connector comprising:
    a first plurality of pins, the first plurality of pins being positioned on a front surface of the USB connector;
    a second plurality of pins, the second plurality of pins being positioned on a top surface of the USB connector;
    wherein each respective one pin of the first plurality of pins is conductively coupled to a corresponding pin of the second plurality of pins;
    wherein the USB connector is mounted to a bottom layer of a printed circuit board;
    wherein the second plurality of pins are positioned on the top surface of the USB connector in a first column having four pins and a second column having five pins, wherein the order of the pins in the first column, from a rear of the USB connector to the front of the USB connector, is pin 1, pin 2, pin 3, and pin 4, and wherein the order of the pins in the second column, from the rear of the USB connector to the front of the USB connector, is pin 9, pin 8, pin 7, pin 6, and pin 5;
    wherein a signal path associated with pin 2 and a signal path associated with pin 3 are directed away from pin 7 and are not split to travel around pin 7, and wherein the signal paths associated with pin 2 and pin 3 transition to a top layer of the printed circuit board via a step-up, cross over the top of signal paths that are associated with pins 5 and 6, and transition back to the bottom layer of the printed circuit board via a step-down; and
    wherein the signal paths associated with pins 2 and 3 are used to route 480 Mbps differential signal pairs.

2. The USB connector of claim 1, wherein each respective one pin of the second plurality of pins contacts a corresponding pin of a third plurality of pins, the third plurality of pins being located at the PCB.

3. The USB connector of claim 1, further comprising:
    a plurality of mounting arms.

* * * * *